United States Patent Office 2,846,477
Patented Aug. 5, 1958

2,846,477
PURIFICATION OF METHANOL

Harry S. Leach and Franklin R. Carlson, Texas City, Tex., assignors of one-half to Monsanto Chemical Company, St. Louis, Mo., and one-half to Heyden Newport Chemical Corporation, New York, N. Y., both corporations of Delaware No Drawing. Application January 2, 1957
Serial No. 632,013

3 Claims. (Cl. 260—643)

This invention relates to the purification of synthetic methanol and, more particularly, it pertains to a method for increasing the so-called "permanganate time" of purified methanol.

In order to meet the rigid specifications prescribed for pure methanol, it is necessary that all traces of impurities be removed from the alcohol. It is known that methanol produced synthetically by hydrogenation of carbon monoxide possesses certain oxidizable contaminants the last traces of which are substantially impossible to remove even by means of highly efficient fractionating columns. The presence of these oxidizable impurities such as carbonyl impurities of an aldehydic or ketonic nature, for example, under ordinary conditions give rise to objectionable odor and impart other undesirable properties as well to the methanol which prevent it from meeting specifications. Because of the obvious advantages of methanol which is free of these oxidizable impurities, many methods have been proposed and developed for treating methanol to secure the pure product. Among the more successful processes thus developed and one in wide commercial use is that which consists of the several steps of treating crude methanol with sulfuric acid and potassium permanganate, neutralizing the excess acid present, and then distilling the thus treated material to recover the pure methanol. While this procedure renders methanol generally suitable for most uses, we have now discovered that the permanganate time of methanol purified by this method may be significantly lengthened if a specific and very small amount of an organic amine is added to the methanol distillate.

It is an object of the present invention, therefore, to provide an improved process for the purification of methanol.

It is a further object of the invention to provide a method for increasing the permanganate time of methanol containing contaminants oxidizable by permanganate.

Other objects and advantages of the invention will become obvious from the following description of the invention.

According to the invention, contaminated or crude methanol containing oxidizable impurities is treated with sulfuric acid and potassium permanganate, excess sulfuric acid is then neutralized by the addition of an alkali metal hydroxide, the resulting mixture is distilled to separate methanol therefrom, and an amount of an organic amine, such as triethyl amine, for example, in the range from about 0.3 mole to about 3 moles of the amine per million moles of distilled methanol is then added to the distilled methanol.

The following example will serve to illustrate the invention but is not to be construed as limiting it in any manner except as it is limited in the appended claims.

Example I

Varying amounts of triethylamine were dissolved in samples of "refined" methanol and the effect of the amine on the permanganate time of the methanol was observed. "Refined" methanol in this case was product or C. P. methanol produced from the crude alcohol synthesized by the catalytic reaction of hydrogen and carbon monoxide. The crude methanol was contacted with 95% sulfuric acid and a substantially saturated aqueous solution of potassium permanganate in a suitable still or vessel provided with means for agitation. A reaction time of approximately 20 minutes was provided. The treated alcohol was then neutralized by the injection of sodium hydroxide with a 100% excess of caustic being employed. The mixture was filtered to remove any solids and the methanol filtrate subjected to fractionation in a 60-plate column. The refined product methanol was taken off as a sidestream, while water, heavy alcohols and other high boilers were removed as bottoms from the still. Permanganate time was determined by treating a 50-ml. sample of methanol with 2.0 ml. of 0.02% solution of potassium permanganate at 15° C. and measuring the time required for reduction of the permanganate as evidenced by disappearance of the purple color determined by matching a color standard. Results of the treatment of the refined methanol was tabulated below. These are indeed surprising in view of the fact that the refined product is collected as the distillate in a fractionation system wherein the still contents are distinctly alkaline.

| Triethyl Amine Conc. (Moles/million Moles of Methanol) | Permanganate Time (Min.) |
|---|---|
| 0 | 49 |
| 0.25 | 54 |
| 0.47 | 65 |
| 1.14 | 67 |
| 2.31 | 65 |
| 4.60 | 50 |
| 11.57 | 29 |

The quantity of amine required in the method of the invention is highly critical. Quantities in excess of 5 moles of amine per million moles of methanol will result in a degredation in methanol quality as measured by permanganate time rather than an improvement. Preferred quantities for improving permanganate time are those in the range from about 0.3 to about 3 moles of amine and optimum improvement is effected with quantities of amine in the range from about 0.45–2.5 moles per million moles of methanol.

Any organic amine may be employed as a treating agent in practicing the method of the invention. Aliphatic amines, however, are preferred and primary, secondary and tertiary alkyl amines such as methyl amine, ethyl amine, propyl amine, dimethyl amine, trimethyl amine, diethyl amine, tert-butyl amine, diisopropyl amine and the like are especially suitable. Particularly preferred as those alkyl amines containing from 1 to 18 carbon atoms.

The permanganate treatment by which the crude methanol is refined to produce the alcohol subjected to the treatment of the invention may be conducted under a wide variety of conditions. In addition to potassium permanganate, for example, sodium or other permanganates may be used. The methanol is generally treated under non-alkaline, or preferably, mildly acidic conditions. Acidity is easily regulated by the addition of small amounts of a mineral acid such as sulfuric acid with the quantity of acid employed being kept about equal in weight percent to the amount of permanganate used. The quantity of permanganate used may range from about 0.02 to 3.0% by weight of the alcohol being treated depending upon the source of the crude methanol and the temperatures at which the oxidation is being effected. More permanganate is required, for example, at temperatures appreciably below atmospheric, particularly if more practical reaction times are desired. Aqueous solutions of permanganate are ordinarily employed but the permanganate my likewise be added in the form of a finely ground solid if so desired. In this case, the time required for disappearance of the permanganate color is about twice as long as that needed when using an aqueous solution. Usually from 20 to 60 minutes at ordinary or atmospheric temperatures must be allowed for the oxidation reaction to be completed. At higher temperatures, up to 50–60° C. for instance, reaction is more rapid but a secondary reaction is accelerated which results in conversion of the methanol to formaldehyde. Preferably, therefore, the permanganate is contacted with the alcohol at temperatures from about 20 to about 35° C.

In the neutralization step, either solid, "flake" caustic, or commercial alkali solutions may be used but the solution is preferred. Here, also, potassium or other alkali metal hydroxides are equally as suitable as the caustic soda used in the examples. For satisfactory results and to insure that all the acid is neutralized, a 100% excess of caustic is employed so that the amount of caustic used lies within the range from about 0.04 to about 6% by weight of the alcohol being treated.

Removal of solids from the neutralized alcohol is effected by filtration, preferably using a leaf filter, although other conventional filtration techniques are also suitable.

The final stage in the preparation of the refined alcohol is a simple fractional distillation to recover the pure methanol either overhead or from a sidestream and any distillation column having fifty or more plates may be operated in the conventional manner for this final rectification.

What is claimed is:

1. In a process for the purification of crude synthetic methanol which consists of treating said methanol with a mineral acid and a water-soluble permanganate, neutralizing the acid present with an alkali metal hydroxide, filtering to remove any solids, and distilling the methanol filtrate to produce a purified methanol distillate, the improvement which comprises adding to said methanol distillate an amount of a tertiary aliphatic amine such that not more than 5 moles of amine are present per million moles of methanol distillate whereby the permanganate time of said purified methanol is significantly lengthened.

2. In a process for the purification of crude synthetic methanol which consists of treating said methanol with sulfuric acid and a water-soluble permanganate, neutralizing the acid present with sodium hydroxide, filtering to remove any solids, and distilling the methanol filtrate to produce a purified methanol distillate, the improvement which comprises adding to said methanol distillate from about 0.45 to about 2.5 moles of a tertiary aliphatic amine per million moles of methanol distillate whereby the permanganate time of said purified methanol is significantly lengthened.

3. The process of claim 2 wherein said amine is triethyl amine.

References Cited in the file of this patent

UNITED STATES PATENTS

| 1,987,601 | Burke | Jan. 15, 1935 |
| 2,227,485 | Bump | Jan. 7, 1941 |

FOREIGN PATENTS

| 494,985 | Great Britain | Nov. 4, 1938 |